United States Patent [19]
Carelli et al.

[11] Patent Number: 5,451,189
[45] Date of Patent: * Sep. 19, 1995

[54] PACKAGING MACHINERY BELT WITH NON-DIRECTIONAL SPLICE

[75] Inventors: Charles E. Carelli, Eagle Bridge; Linda L. Springer, Buskirk, both of N.Y.

[73] Assignee: AlliedSignal Inc., Morris Township, N.J.

[*] Notice: The portion of the term of this patent subsequent to Nov. 1, 2011 has been disclaimed.

[21] Appl. No.: 288,238

[22] Filed: Aug. 9, 1994

Related U.S. Application Data

[63] Continuation-in-part of Ser. No. 142,538, Oct. 25, 1993, Pat. No. 5,360,379.

[51] Int. Cl.$^6$ ............................................. F16G 7/00
[52] U.S. Cl. ............................................. 474/254
[58] Field of Search ............... 474/253, 256, 260–268; 156/157, 73.4; 428/57–58; 24/38

[56] References Cited

U.S. PATENT DOCUMENTS

| | | |
|---|---|---|
| 1,411,602 | 4/1922 | Barnard . |
| 1,849,471 | 3/1932 | Arnold . |
| 2,182,169 | 12/1939 | Bierer ............................ 474/254 |
| 2,391,731 | 12/1945 | Miller et al. . |
| 2,441,460 | 5/1948 | Walters . |
| 2,737,466 | 3/1956 | Utermohlen, Jr. et al. ......... 154/43 |
| 3,101,290 | 8/1963 | Paul ........................ 474/254 X |
| 3,217,555 | 11/1965 | Brooksbank ................ 474/254 |
| 3,366,551 | 1/1968 | Haller ........................ 245/10 |
| 3,596,858 | 5/1969 | Curtis et al. ................ 245/10 |
| 3,693,218 | 9/1972 | Jaubert et al. ................ 24/38 |
| 3,728,183 | 4/1973 | Wasco et al. ................ 156/73 |
| 3,936,338 | 2/1976 | Gibson ........................ 156/157 |
| 4,083,090 | 4/1978 | Duvekot ........................ 28/104 |
| 4,130,679 | 12/1978 | Breznak et al. ................ 428/58 |
| 4,288,965 | 9/1981 | James ........................ 53/451 |
| 4,430,844 | 2/1984 | James ........................ 53/450 |
| 4,501,782 | 2/1985 | Weatherly et al. ................ 428/57 |
| 4,530,868 | 7/1985 | Shinmi ........................ 428/57 |
| 4,569,870 | 2/1986 | Shini ........................ 428/57 |
| 4,693,058 | 9/1987 | Kovacs ........................ 53/552 |
| 5,360,379 | 11/1994 | Carelli et al. ................ 474/260 |

FOREIGN PATENT DOCUMENTS

| | | |
|---|---|---|
| 1553493 | 12/1968 | France . |
| 2109345 | 12/1970 | France . |
| 3238584 | 10/1982 | Germany . |
| 837048 | 7/1958 | United Kingdom . |

*Primary Examiner*—Michael Powell Buiz
*Attorney, Agent, or Firm*—Roger H. Criss

[57] ABSTRACT

A spliced narrow non-directional endless belt for packaging applications, for use with plastic film wrapping packaging equipment. The ends of a coated fabric belt material are butted together and a splice material (also a coated fabric) is centered over the butted ends. Coatings of fluoropolymer dispersions are preferably applied over the various layers, and the entire construction is laminated together into a unitary construction. A fluoropolymer film may be positioned on the inner surface of the belt over the butted ends and over the edges of the belt onto the splice on the front surface of the belt.

The resulting spliced belt is non-directional in that it is adapted to rotate in either a clockwise or counterclockwise direction when installed in the packaging equipment.

23 Claims, 3 Drawing Sheets

PACKAGING MACHINERY BELT WITH NON-DIRECTIONAL SPLICE

CROSS-REFERENCE TO RELATED APPLICATIONS

This application is a continuation-in-part of Ser. No. 08/142,538 filed Oct. 25, 1993. Now U.S. Pat. No. 5,360,379.

BACKGROUND OF THE INVENTION

1. Field of the Invention

This invention relates to a spliced non-directional belt which is particularly adapted for use in the heat sealing and plastic film wrapping packaging industry.

2. Description of the Prior Art

Packaging and conveyor belts are used in a wide variety of applications. One area in which such belts formed from polytetrafluoroethylene (PTFE) coated glass fabrics are used is in the packaging industry. In particular, apparatus is in wide use today which is known as form-fill-seal packaging equipment. In such equipment, a web of flexible packaging material, typically a plastic film, is pulled from a supply and is fed over a device for forming it into a tube, a product to be packaged is then provided in the tubing, the tubing is separated into individual packages, the ends of the packages may be folded over and are sealed. Examples of products which are packaged in such manner are cylindrical paper rolls which have hollow cores. These rolls, such as toilet paper or paper towel rolls, are typically packaged in a plastic film in a compressed state to facilitate shipping.

One type of equipment that is used in such application is made by the Hayssen Manufacturing Company of Sheboygan, Wis. USA. Such equipment uses packaging belts to transport the product and heat seal a plastic wrap around the product. In the latter operation, in one equipment design the packaging belts are typically positioned vertically and surround heat seal bars which are used to heat seal the ends of the package. PTFE coated glass fabric endless belts are used in such equipment since the belts are strong, resistant to heat and do not stick to the plastic film. Typically these belts are fairly narrow, having a width on the order of about 4 to 15 inches (about 102 to 381 mm) and a length on the order of 8 to 18 feet (about 2.03 to 4.57 m). These belts may be provided with fastening studs or other guiding means along one or both edges which are adapted to operate with pulley wheels on the equipment.

Such endless belts have been heretofore fabricated with overlapping angled splices (typically angled at 45 degrees). These splices are either right-handed or left-handed, depending on the intended direction of rotation of the belt. That is, the angled end of the belt that overlaps the other angled end is intended to face away from the direction of rotation of the belt so that this end does not get caught up in the equipment and cause damage to the belt.

One of the problems associated with this existing system is the need to manufacture, order, stock and install belts of both the right-handed and left-handed variety, depending on whether the belts are intended for rotation in the clockwise or counterclockwise direction when installed in the machinery. Through carelessness or lack of knowledge, end users frequently inadvertently install the wrong rotation belt causing premature belt failure. The edges of these splices delaminate and may cause the belt to self destruct. This is costly both in terms of belt replacement, equipment down-time and dual stock requirements.

In the existing belts, the splice also has a tendency to wick chemicals that are applied to the belt. In some packaging equipment, liquid release agents, lubricants or other chemicals are sprayed onto the belt so as to ensure that the belt does not stick to the plastic film that is used as the package overwrap. Wicking or pickup of such materials can cause premature delamination of the splice and/or fraying of the glass fabric.

It would be desirable to provide a spliced belt which is non-directional, such that the belt could be used in either direction of rotation. It would also be desirable to provide a spliced belt which alleviated the other problems discussed above.

SUMMARY OF THE INVENTION

In accordance with this invention, there is provided a non-directional endless belt construction adapted for use in packaging applications, the belt comprising:

a belt material having two edges and two ends, said ends being butted together, the belt material being formed from a coated fabric, the belt material having an outer surface and an inner surface; and a splice formed from a coated fabric, the splice covering the outer surface of the belt material over the butted ends thereof, the splice extending substantially across the width of the belt material;

the belt material and splice being laminated together into a unitary construction, whereby when the belt is installed in a packaging apparatus, it is adapted to rotate in either the clockwise or counterclockwise direction.

Preferably, there is a film extending over at least the butted ends of the belt material on the inner surface thereof and extending at least substantially across the width of the belt material.

Also in accordance with this invention, there is a provided a method for forming a non-directional endless belt construction adapted for use in packaging applications, the method comprising:

(a) providing a length of belt material, the belt material being formed from a coated fabric and having two edges, two ends and inner and outer surfaces;

(b) butting together the ends of the belt material to provide a butted joint;

(c) providing a splice formed from a coated fabric;

(d) positioning the splice over the outer surface of the belt material above the butted joint; and (e) subjecting the spliced area of the belt material to heat and pressure in order to laminate the belt material and splice together into a unitary construction, whereby when the belt is installed in a packaging apparatus, it is adapted to rotate in either the clockwise or counterclockwise direction.

Preferably, the method includes the step of covering the inner surface of the belt material along the butted joint with a film such that the film extends at least substantially across the width of the belt material.

Preferably, another film is provided on the butted ends of the belt material before the splice is positioned thereover, and yet another film extends over the splice and substantially encapsulates the splice. Preferably, the films are fluoropolymer films, most preferably PTFE. In addition, preferably the various layers are provided with a coating, most preferably a fluoropolymer coating, during the preparation of the splice in order to aid in the lamination of the layers.

In patent application Ser. No. 08/142,538 identified above, there is a description of a similar belt construction which includes at least two films. In the present invention, such films are not required as the splice construction can have sufficient integrity for many usages without such film layers.

This invention provides significant benefits. The belts are "non-directional" (or, equivalently, "bidirectional") in that they can be used in either direction of rotation when installed in packaging equipment. Belts formed with the splice of the present invention have extended useful life spans over conventional belts. Labor and production costs are decreased by less down-time caused by belt failure. The stocking of right-handed and left-handed belts is eliminated. Such non-directional splices reduce stocking requirements and part number assignments by half. Furthermore, maintenance personnel no longer have to determine the direction of travel in order to select the appropriate belt. In addition, the splice is stronger and its design reduces the tendency of the edges of the splice to delaminate. The splice construction retards wicking of release agents, other chemicals and lubricants which are typically applied to the belts in packaging applications.

DESCRIPTION OF THE PREFERRED EMBODIMENTS

Figure 1:
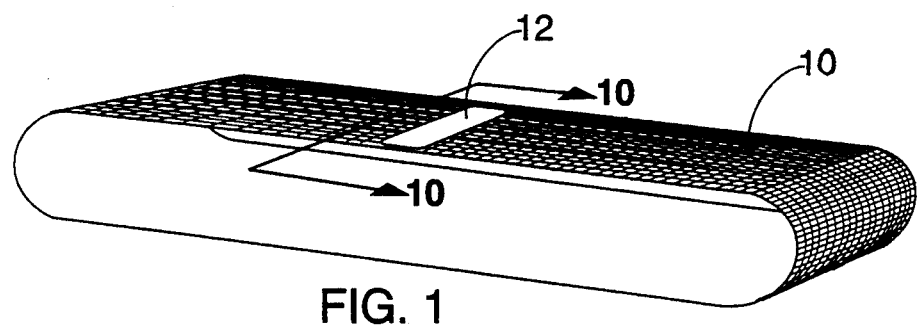
FIG. 1 is an isometric view of a packaging belt with the splice of this invention.

With reference to the drawings, in FIG. 1 there is shown a non-directional splice 12 for connecting two ends of a fabric or composite belt 10, thereby making it endless or continuous. It should be noted that the drawings are not necessarily to scale.

Belt 10 is preferably formed from a high strength fabric 14 which is coated with a heat resistant, non-sticking material, preferably a fluoropolymer, although other materials (e.g., silicone) can be used. Fabric 14 is preferably formed from glass fibers, aramid fibers (e.g., Kevlar®), high strength polyethylene fibers (e.g., Spectra®), or the like. Fabric 14 is generally formed with a tight weave. The preferred fluoropolymer which is used to coat the fabric is PTFE, although other fluoropolymers, such as FEP (fluorinated ethylene propylene) can be used. Fabric 14 can be constructed into an endless belt of any desired length and width, although as indicated above for Hayssen-type belt applications the belt typically has a width of about 4 to 15 inches (about 102 to 381 mm). These belts are sometimes referred to herein as "narrow" belts. Such belts typically have a length of about 8 to 18 feet (about 2.03 to 4.57 m).

Splice 12 is preferably formed from the same type of material that is used in the belting itself. That is, splice 12 can be formed from PTFE coated fiberglass or aramid yarns 24, etc. For example, the fabric substrate may be a glass fabric having a thickness of about 0.003 to 0.004 inches (about 0.08 to 0.1 mm), with a coating of up to about 0.004 to 0.006 (about 0.1 to 0.15 mm) of PTFE on the fabric. Such coating may or may not be sintered. Such fabric can have PTFE (or other fluoropolymer) film laminated to one or both sides. Such film can be extruded, skived or cast.

Figure 2:
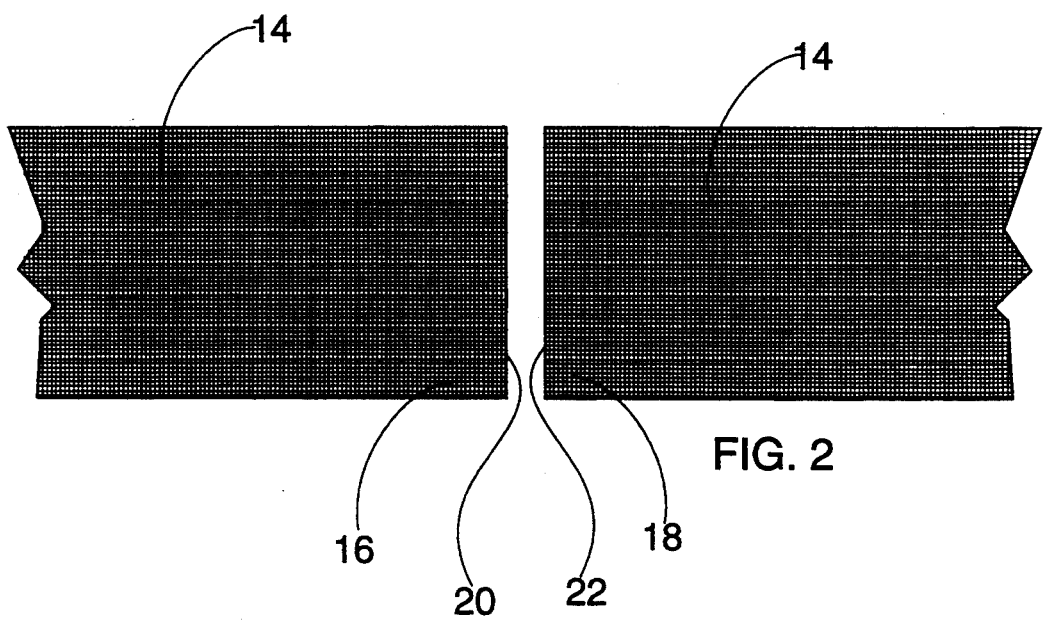
FIG. 2 is a plan view of the ends of the belt before assembly of the splice.

Non-directional or bidirectional belt 10 of this invention is formed in the following manner. The material of the belt construction is cut to the finished width, and to the finished length, with the ends squared. The ends 16, 18 of the belt material are butted together, preferably with no overlap, so that terminal portions 20, 22 of ends 16, 18 contact each other. FIG. 2 shows the two ends of the belt before they are butted together. It should be appreciated that FIGS. 2 and 4–8 are shown in expanded form in order to facilitate an understanding of the invention.

Figure 3:
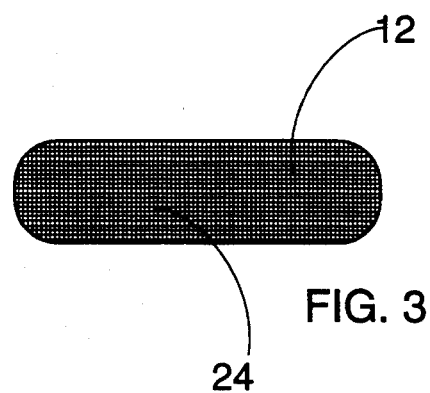
FIG. 3 is a plan view of the splice.
Figure 4:
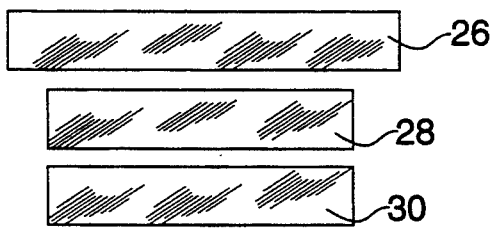
FIG. 4 is a plan view of components of the construction of the spliced belt.

The material of splice 12 is cut to a width which is preferably the width of the belt, and to a length which is fairly short, preferably on the order of 1 inch (25 mm) or so. The corners of splice 12 are preferably rounded as shown in FIG. 3. With respect to FIG. 4, three pieces of PTFE film are cut to the appropriate dimensions; this material typically has a thickness of about 1 to 3 mils (0.025 to 0.075 mm). Such PTFE film may be extruded, skived or cast. Preferably, a piece 26 of PTFE film is cut about 2 inches (51 mm) long and about 2 inches (51 mm) wider than the width of the belt; this piece forms the second film described below. Another piece 28 of PTFE film is cut also about 2 inches (51 mm) long and about the width of the belt wide; this piece forms the first film described below. Another piece 30 of PTFE film is cut slightly shorter than the first two, on the order of about 1.5 inches (38 mm) long and also about the width of the belt wide; this piece forms the third film described below.

Figure 5:
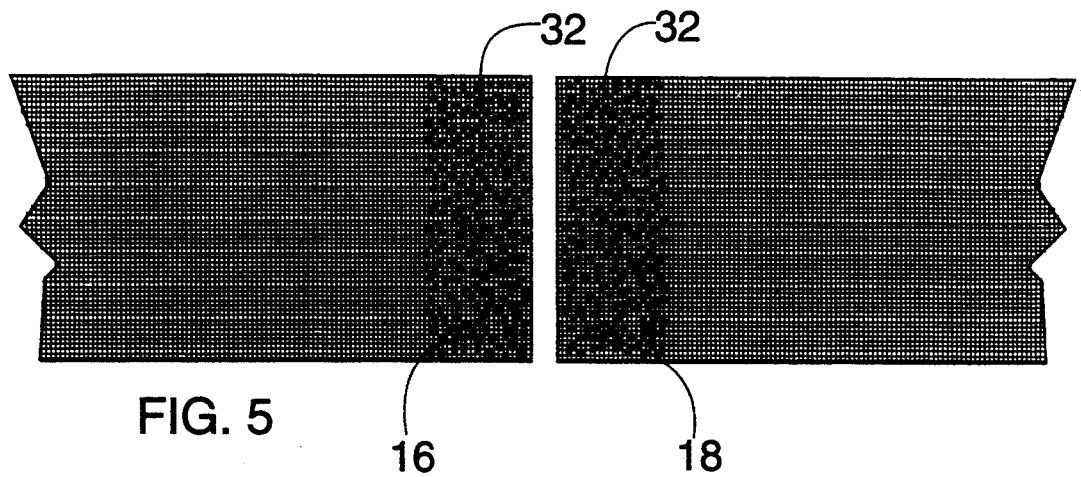
FIG. 5 is a plan view of one stage in the assembly of the spliced belt.

As shown in FIG. 5, preferably butt ends 16, 18 of the fabric to be spliced are coated with a suitable material 32 to aid in the lamination of the splice. This material preferably is a PTFE dispersion, although a dispersion of another fluoropolymer (e.g., FEP) or other material may be used. If desired, other coating forms, such as solutions, may be used for any of the coating layers of the construction of this invention. The dispersion is coated onto both ends 16, 18 of the fabric across the entire width and extending a distance from each edge 20, 22. This distance is preferably about equal to the length of the third PTFE film 30. Ends 16, 18 of the fabric are butted together, and third PTFE film 30 is laid over the butted edges 20, 22, with an equal amount over each end of the belt and centered over the butted joint. Film 30 is then pressed by a heated hand iron or the like to make sure that wrinkles and air pockets and excess moisture are removed.

Figure 6:
FIG. 6 is a cross-sectional view of another stage in the assembly of the spliced belt.
Figure 7:
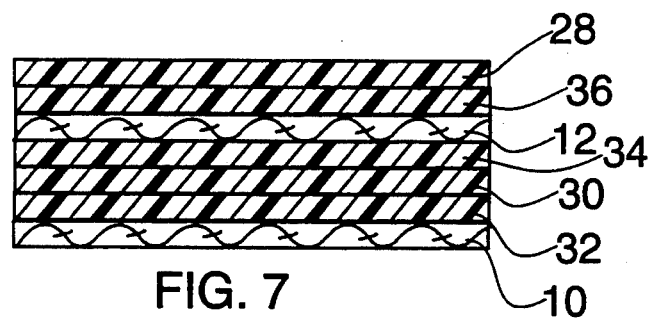
FIG. 7 is a cross-sectional view of a subsequent assembly stage.
Figure 8:
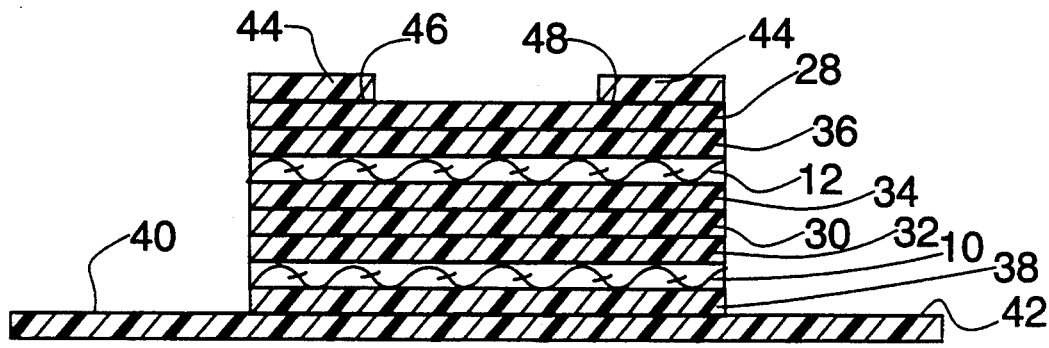
FIG. 8 is a cross-sectional view of a subsequent assembly stage.
Figure 9:
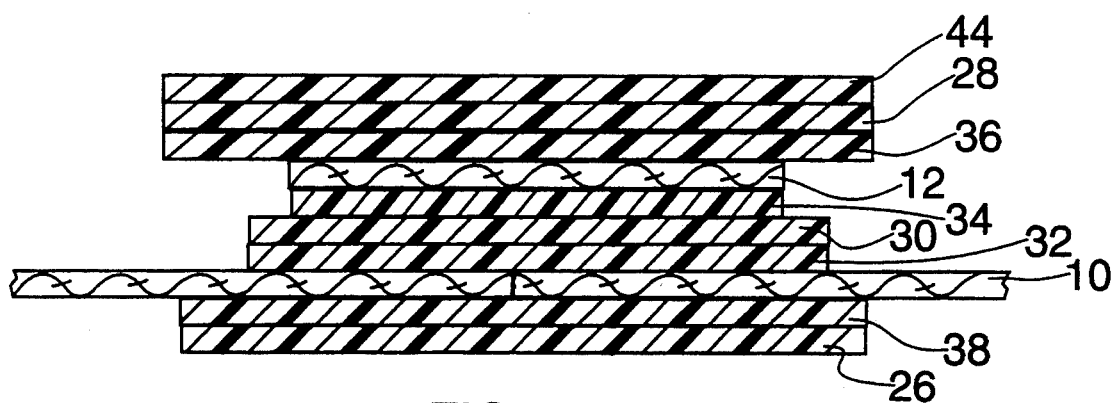
FIG. 9 is a side view of the splice assembly shown in FIG. 8.
Figure 10:
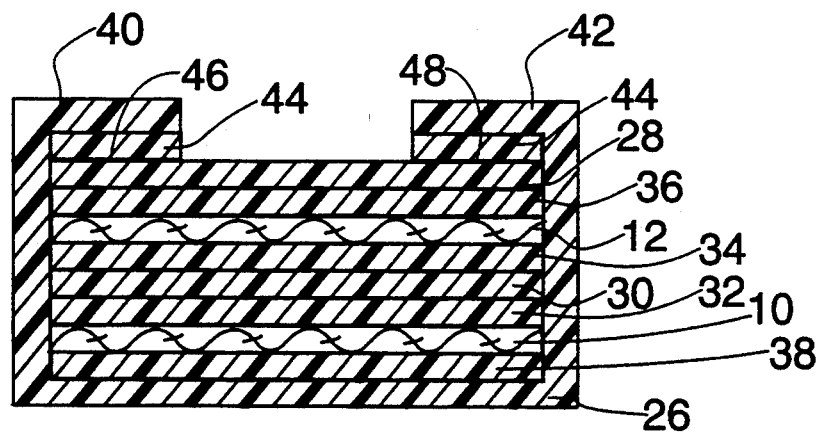
FIG. 10 is a cross-sectional view of the final construction of the splice belt of this invention.

Next, the bottom side of splice material 12 is also coated with a PTFE dispersion 34 or the like, as shown in FIG. 6. Splice 12 is centered equally over the butted ends (coated side down) and is pressed onto the construction, also preferably by a heated hand iron. Next, the entire splice construction up to this point is also coated with a PTFE or other dispersion 36. First PTFE film 28 is then centered evenly over the splice and pressed onto it, again preferably by a heated hand iron. First film 28 covers the entire area of splice 12 so as to encapsulate it; this stage of assembly is shown in FIG. 7. The belt is then carefully turned inside out and an area of about 1 inch (25.4 mm) on each side of the butted joint is coated, again preferably with a PTFE or other dispersion 38. Second PTFE film 26 is then applied equally over the butted ends 16, 18 with ends 40, 42 extending about one inch (25.4 mm) over each side of the belt. Second film 26 is also pressed onto the belt, again preferably by a heated hand iron, as shown in FIG. 8. The second film assists in securing the butted ends together. The belt is then carefully turned back to its original position. An area of about 2 inches (50.8 mm) long by 1 inch (25.4 ram) wide is then coated, preferably with a PTFE or other dispersion 44 onto each edge portion 46, 48 of film 26 on either end of the spliced area, also as shown in FIG. 8. Alternatively, ends 40, 42 could be so coated. Overlapping ends 40, 42 of second PTFE film 26 are then folded over onto the coated edge areas and again pressure is applied, such as by a heated hand iron, as shown in FIG. 9.

The splice is now ready to be pressed into an integrated laminated structure. Belt 10 is placed in a suitable mechanical press and the spliced area is aligned properly in the press. Suitable pressure and temperature are applied for a time sufficient to fully laminate the splice. For example, with a PTFE coated belt and a PTFE coated splice material, and with PTFE films and coatings, the belt may be pressed at a pressure of about 20 to about 40 psi (about 138 to 276 kPa) at a temperature of from about 700° to about 750° F. (about 371° to 399° C.) for about 0.5 to about 2 minutes. This results in the PTFE dispersions to solidify and the PTFE films to flow such that a welded structure is obtained. Different temperatures, pressures and times may be needed with other materials of construction.

A reinforcing strip to accommodate tracking devices, such as snap fasteners, grommets, silicone strips, or other guiding materials may or may not be used on one or both edges of the belt.

Regarding the various fluoropolymer coatings mentioned above, each dispersion may be the same or different from the other layers. Also, each fluoropolymer film may be the same or different from the other films used in the construction.

As discussed above, the first, second and third films are optional in the construction of this invention. A non-directional endless belt construction can be provided for use in many packaging applications without the use of any of the film layers.

In one alternate embodiment, only the second film layer is employed. In another alternate embodiment, both the second and third films are used. In the constructions where the films are not employed, preferably the coatings 32, 34, 36 and 38 are used.

As mentioned above, the resulting spliced belt can be used in packaging equipment and be rotated in either the clockwise or counterclockwise direction. Thus, the spliced belt of this invention is non-directional, in contrast to the existing angled spliced belts which are constructed so as to be rotated in only one direction. The spliced area of the belt is fabricated so as to provide a thin cross-section area. By using relatively thin materials in the construction of the spliced area, the resulting thin splice does not detract from the advantageous heat transfer properties attendant with the use of the thin narrow belts of this invention in heat sealing packaging machinery.

In addition, the spliced area of the belt has a slightly stepped profile in that the third film is shorter than the first and second films and the splice itself. This assists in easier passage of the belt in the packaging equipment. Moreover, since the splice is coated with a PTFE or other dispersion or encapsulated by the first film (as well as by the overlapped edges of the second film), the yarns of the splice material do not become exposed. As a result, the splice does not wick up chemicals that are sprayed on the belt during use in packaging equipment.

Also as pointed out above, the belt is non-directional in that it can be installed to run in either the clockwise or counterclockwise direction in the packaging (or other) equipment. This eliminates the need for left and right handed belts and the expenses related to having such a two belt system.

It should also be pointed out that the use of an aramid fabric as the belt material, as well as the splice material, has certain advantages as well. The aramid belts are less flexible and therefore do not tend to lose their shape or stretch unequally across their width. Such uneven belt tension also contributes to early splice and belt failure. In addition, the aramid fabrics provide improved abrasion resistance, tear resistance and tendency to wick. Furthermore, less pressure has to be applied to the machine tensioners to drive the belts adequately. Such tension also contributes to premature failure of the belts. The surfaces of the aramid belting may have a slight "hill and valley" type texture that helps to reduce unwanted build-up caused by smeared plastics (from the heat sealing operation) moving along smooth heated surfaces. The belting of this invention readily transfers heat and is flexible, yet not so supple as to lose its original shape.

It can be seen that the present invention provides a non-directional spliced belt which can be used in various packaging equipment with labor and material cost savings, as well as increased useful belt life.

We claim:

1. A non-directional endless belt construction adapted for use in packaging applications, said belt comprising: a belt material having two edges and two ends, said ends being butted together, said belt material being formed from a coated fabric, said belt material having an outer surface and an inner surface; and a splice formed from a coated belt, said splice covering said outer surface of said belt material over the butted ends thereof, said splice extending substantially across the width of the belt material; a film extending over at least said butted ends of said belt material on said inner surface thereof and extending at least substantially across the width of said belt material; said belt material and splice being laminated together into a unitary construction, whereby when said belt is installed in a packaging apparatus, it is adapted to rotate in either the clockwise or counterclockwise direction.

2. The belt construction of claim 1, wherein said belt is a narrow belt and is adapted for use in sealing plastic film wrapped packages.

3. The belt construction of claim 2, wherein said ends of said belt material are butted together in a non-overlapping arrangement.

4. The belt construction of claim 1, wherein said film extends from said inner surface of said belt material over both edges of said belt material and over the outer surface of said splice.

5. The belt construction of claim 1, further comprising another film positioned over said outer surface of said belt material at said butted ends and beneath said splice.

6. The belt construction of claim 3, further comprising a first fluoropolymer coating extending over said outer surface of said belt material at said butted ends and extending substantially across the width of said belt material.

7. The belt construction of claim 6, further comprising a second fluoropolymer coating extending on a first surface of said splice:

8. The belt construction of claim 7, further comprising a third fluoropolymer coating extending on a second surface of said splice.

9. The belt construction of claim 8, further comprising a fourth fluoropolymer coating extending over said inner surface of said belt material adjacent said butted ends and extending substantially across the width of said belt material.

10. The belt construction of claim 5, wherein said films are formed of a fluoropolymer.

11. The belt construction of claim 10, wherein said fluoropolymer is polytetrafluoroethylene.

12. The belt construction of claim 2, wherein said belt material is formed from polytetrafluoroethylene coated glass fabric.

13. The belt construction of claim 12, wherein said splice material is formed from polytetrafluoroethylene coated glass fabric.

14. The belt construction of claim 2, wherein said belt material is formed from fluoropolymer coated aramid fabric.

15. The belt material of claim 9 including a film extending over said butted ends of said belt material on said inner surface thereof and extending across the width of said belt material, over both edges of said belt material and over the outer surface of said splice.

16. A method for forming a non-directional endless belt construction adapted for use in packaging applications, said method comprising:
(a) providing a length of belt material, said belt material being formed from a coated fabric and having two edges, two ends and inner and outer surfaces;
(b) butting together said ends of said belt material to provide a butted joint;
(c) providing a splice formed from a coated fabric;
(d) positioning said splice over said outer surface of said belt material above said butted joint; and positioning a film over said splice; and
(e) subjecting the spliced area of said belt material to heat and pressure in order to laminate said belt material and splice together into a unitary construction, whereby when said belt is installed in a packaging apparatus, it is adapted to rotate in either the clockwise or counterclockwise direction.

17. The method of claim 16, wherein said ends of said belt material are butted together in a non-overlapping arrangement and said belt is a narrow belt.

18. The method of claim 17, wherein said film covers said inner surface of said belt material along said butted joint, said film extending substantially across the width of said belt material, over both edges of said belt material and over the outer surface of said splice.

19. The method of claim 14, wherein said film is wider than said belt material and including the step of folding over the ends of said film over said edges of said belt material and over said outer surface of said splice.

20. The method of claim 19, including the step of positioning another film over said outer surface of said butted joint prior to positioning said splice over said butted joint.

21. The method of claim 17, including the step of coating a fluoropolymer material on said outer surface of said butted joint.

22. The method of claim 21, including the step of coating a fluoropolymer material on said splice material on a first surface thereof.

23. The method of claim 17, wherein said belt material and said splice material are formed from polytetrafluoroethylene coated glass fabric.

* * * * *